(12) United States Patent
Wang et al.

(10) Patent No.: US 10,466,427 B2
(45) Date of Patent: Nov. 5, 2019

(54) OPTICAL MODULE WITH INTEGRATED LENS

(71) Applicant: Finisar Corporation, Sunnyvale, CA (US)

(72) Inventors: William H. Wang, Pleasanton, CA (US); Shamei Shi, Shanghai (CN); Huaping Peng, Shanghai (CN); Ranran Zhang, Shanghai (CN); Haijun An, Pingliang (CN)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 15/920,178

(22) Filed: Mar. 13, 2018

(65) Prior Publication Data

US 2018/0267263 A1 Sep. 20, 2018

Related U.S. Application Data

(60) Provisional application No. 62/471,165, filed on Mar. 14, 2017.

(51) Int. Cl.
*G02B 6/42* (2006.01)
*G02B 6/32* (2006.01)
*G02B 6/38* (2006.01)

(52) U.S. Cl.
CPC .......... *G02B 6/4206* (2013.01); *G02B 6/32* (2013.01); *G02B 6/3893* (2013.01); *G02B 6/428* (2013.01); *G02B 6/4214* (2013.01); *G02B 6/4228* (2013.01); *G02B 6/4292* (2013.01); *G02B 6/4246* (2013.01); *G02B 6/4279* (2013.01); *G02B 6/4284* (2013.01)

(58) Field of Classification Search
None
See application file for complete search history.

(56) References Cited

U.S. PATENT DOCUMENTS

| 5,515,468 | A  | * | 5/1996  | DeAndrea | G02B 6/4201 385/88 |
|-----------|-----|---|---------|----------|--------------------|
| 7,539,367 | B2 | * | 5/2009  | Tamura   | G02B 6/4214 385/14 |
| 8,297,856 | B2 | * | 10/2012 | Banal, Jr. | G02B 6/4292 385/135 |
| 9,057,852 | B2 | * | 6/2015  | Morioka  | G02B 6/4286 |
| 9,081,156 | B2 | * | 7/2015  | Togami   | G02B 6/3885 |
| 9,645,334 | B2 | * | 5/2017  | Ishii    | G02B 6/4272 |

(Continued)

OTHER PUBLICATIONS

International Search Report and Written Opinion dated Jul. 17, 2018, in related PCT Application No. PCT/US2018/022507.

*Primary Examiner* — Omar R Rojas
(74) *Attorney, Agent, or Firm* — Maschoff Brennan

(57) ABSTRACT

In an embodiment, an optoelectronic module includes a printed circuit board (PCB) and a lens block. The printed circuit board (PCB) includes at least one of an optical transmitting or receiving array. The lens block may be configured for directly coupling light between one of the optical transmitting or receiving array to optical fibers in an optical cable. A method may include directly coupling light between one of an optical transmitting or receiving array and a lens block, and further coupling the light through the lens block directly to an optical fiber of an optical cable externally coupled to the optoelectronic module.

20 Claims, 10 Drawing Sheets

(56) References Cited

U.S. PATENT DOCUMENTS

| | | | |
|---|---|---|---|
| 9,646,334 B2* | 5/2017 | Ishida | G06Q 30/0282 |
| 9,891,385 B2* | 2/2018 | Tang | G02B 6/32 |
| 2011/0081119 A1 | 4/2011 | Togami et al. | |
| 2012/0148202 A1 | 6/2012 | Banal, Jr. et al. | |
| 2015/0362686 A1* | 12/2015 | Wang | G02B 6/4292 |
| | | | 385/89 |
| 2016/0246019 A1 | 8/2016 | Ishii et al. | |

\* cited by examiner

OPTICAL MODULE WITH INTEGRATED LENS

CROSS-REFERENCE TO RELATED APPLICATION

A claim for benefit of priority to the Mar. 14, 2017 filing date of the U.S. Patent Provisional Application No. 62/471,165, titled OPTICAL MODULE WITH INTEGRATED LENS (the '165 Provisional Application), is hereby made pursuant to 35 U.S.C. § 219(e). The entire disclosure of the '165 Provisional Application is hereby incorporated herein.

FIELD

Some embodiments relate generally to optoelectronic modules. More particularly, example embodiments relate to connectors for connecting fiber optic communication cables to optoelectronic modules.

BACKGROUND

Communication modules, such as electronic or optoelectronic transceiver, or transponder modules, are increasingly used in electronic and optoelectronic communication. Some modules are pluggable, which permits the module to be inserted into and removed from a cage of a host device, such as a host computer, switching hub, network router, or switch box. Each module typically communicates with a printed circuit board of the host device by transmitting and/or receiving electrical data signals to and/or from the host device printed circuit board. These electrical data signals can also be transmitted by the module outside the host device as optical and/or electrical data signals. Active cables include communication cables with communication modules at one or both ends of the communication cables. Some communication modules include a multi-fiber push on ("MPO")-style female connector for receiving an MPO-style male connector that is attached to the communication cable.

Some data transmission involves the conversion of optical signals to electrical signals and/or electrical signals to optical signals. In some applications, the conversion occurs at a circuit board. For example, an optical cable carrying one or more optical signals may interface with an optoelectronic module such as a board-mounted optical assembly (BOA) such as an optical engine, or a pluggable optoelectronic module such as an XFP, a QSFP, an SFP+, or other pluggable optoelectronic module. At the BOA, the optical signals may be transduced from optical signals to electrical signals using optical receivers. The electrical signals may then be communicated along etched copper traces integrated into the circuit board to a destination. Likewise, electrical signals may be communicated along etched copper traces to the BOA. At the BOA, the electrical signals may be transduced to optical signals by optical transmitters. The optical signals may then be further communicated along the same or a different optical cable that interfaces with the optoelectronic module.

In some BOAs, a lens assembly may be configured to receive an optical interface such as a cable connector. The optical interface generally supports one or more optical fibers that communicate the optical data to and from the BOA. One of the shortcomings of communication modules is that they may include many optically and electrically conductive components as well as many mechanical components that may require significant manufacturing processes.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to optoelectronic modules for coupling with cable connectors that may be used in the transmission of optical signals.

In an example embodiment, an optoelectronic module includes a printed circuit board (PCB) and a lens block. The printed circuit board (PCB) may include an optical transmitting or receiving array. The lens block may be configured for directly coupling light from the optical transmitting or receiving array to optical fibers in a cable. The cable is further configured to couple to the optoelectronic module.

In another example, an optoelectronic module may include a printed circuit board (PCB) and a lens block. The printed circuit board may include an optical transmitting or receiving array and the lens block may be configured to directly couple light between optical fibers external to the optoelectronic module and the optical transmitting or receiving array.

In yet another example, a method may include coupling light from an optical transmitting or receiving array into a lens block. The light may then be passed directly between the lens block and an optical fiber of a cable externally coupled to the optoelectronic module.

BRIEF DESCRIPTION OF THE DRAWINGS

The aspects of the disclosure will be described and explained with additional specificity and detail through the use of the accompanying drawings in which.

DESCRIPTION OF SOME EXAMPLE EMBODIMENTS

Optical transceivers may exchange light with optical fibers coupled to the optoelectronic module using ferrules. The active devices of the transmitters and receivers are typically aligned to the fibers via ferrules with either the active optical device being mounted on a flex circuit extended from the printed circuit board (PCB). Alternatively, the fiber cable and the active devices may be coupled using an intermediary optical fiber patch cord internal to a housing. In either configuration, one or more intermediary devices (e.g., a flex circuit or an internal optical fiber patch cord) have been required for coupling the optical active devices to an external fiber optic cable.

Embodiments disclosed herein do not require intermediary tethers and instead directly couple light between the optically active (e.g., transmitter or receiver) devices and the external optical fiber cable using a single optical lens block. More particularly, some example embodiments relate to a pluggable connector for an optoelectronic module. The pluggable connector may be secured to the optoelectronic module to, for example, optically couple one or more optical fibers of the optical cable to a lens or lens assembly of the optoelectronic module. In some embodiments, an optoelectronic module may include a printed circuit board (PCB) and a lens block. The printed circuit board (PCB) may include one or more of an optical transmitting or receiving array. The lens block may be configured for directly coupling light between the optical transmitting or receiving array and optical fibers in a cable external to the housing of the optoelectronic module. The cable may be further configured to mechanically couple to the optoelectronic module.

In other embodiments, an optoelectronic module may include an optoelectronic module including a printed circuit board (PCB) and a lens block. The printed circuit board may include optical transmitting or receiving array. The lens block may be configured to directly couple light between optical fibers external to the optoelectronic module and the optical transmitting or receiving array.

In still other embodiments, a method may include coupling light from an optical transmitting or receiving array into a lens block. The light may then be transmitted or received through the lens block directly with an optical fiber of a cable coupled to the optoelectronic module.

Reference will now be made to the drawings to describe various aspects of some embodiments. It is to be understood that the drawings are diagrammatic and schematic representations of the embodiments, and are not meant to be limiting, nor are they necessarily drawn to scale. Throughout the drawings, like numbers generally reference like structures unless described otherwise.

Figure 1A:
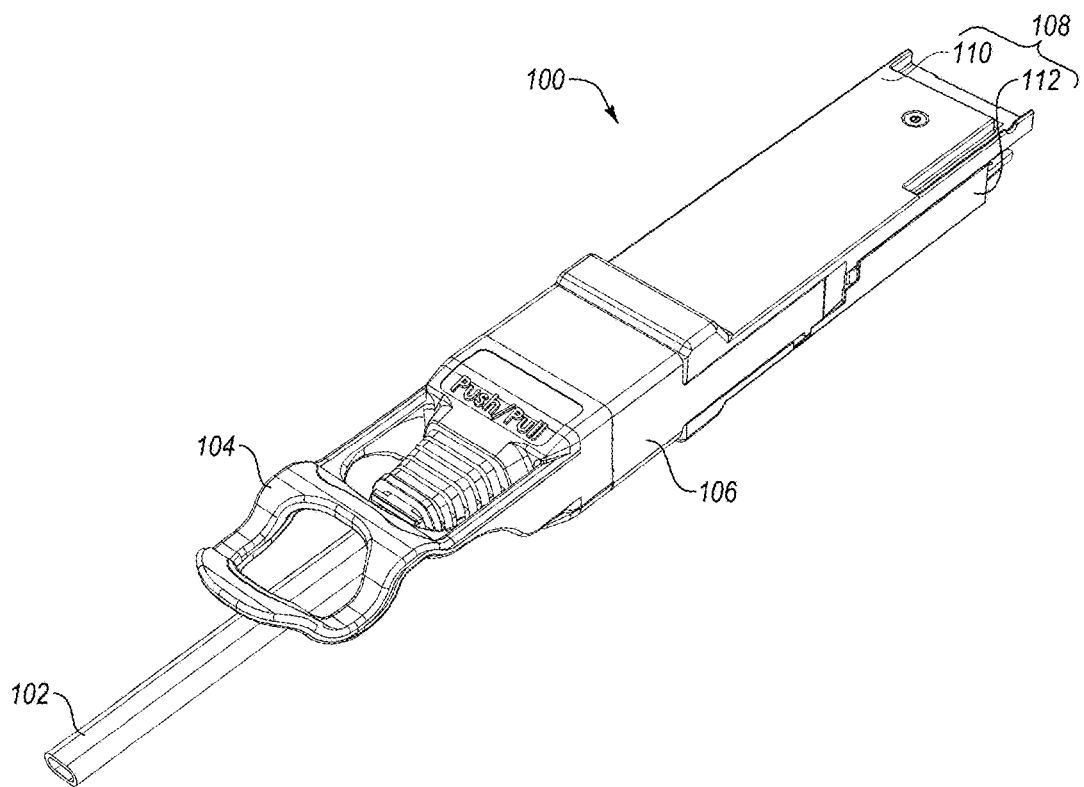
FIG. 1A is a top perspective view of an example optoelectronic module and an attached communication cable.
Figure 1B:
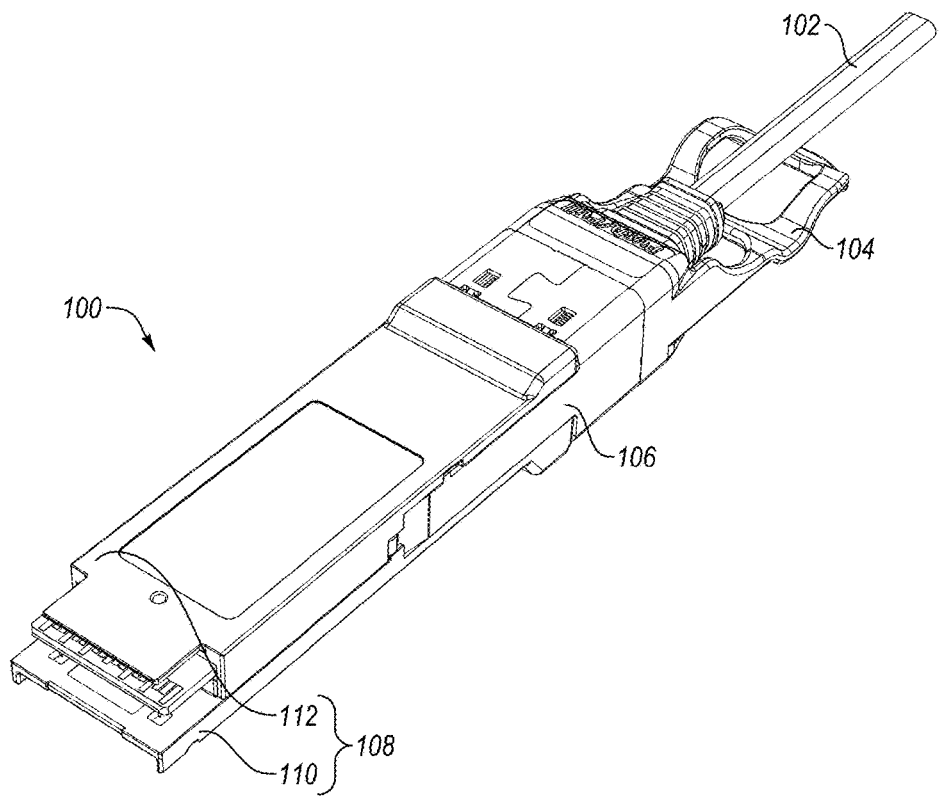
FIG. 1B is a bottom perspective view of the example optoelectronic module and attached communication cable of FIG. 1A.

Reference is first made to FIGS. 1A and 1B, which are top and bottom perspective views of an example optoelectronic module 100 for use in transmitting and receiving optical signals in connection with one or more other devices on a network, and communicating via electrical signals with a host device. As disclosed in FIGS. 1A and 1B, the optoelectronic module 100 may be fixedly attached to a communication cable 102, and thus the optoelectronic module 100 represents one end of an "active cable" which includes another optoelectronic module (not shown) which also may be attached to the other end of the communication cable 102.

It is understood, however, that the communication cable 102 could instead be detachably connected to the optoelectronic module 100, in which case the optoelectronic module 100 would function as a stand-alone module. For example, where the communication cable 102 is a fiber-optic ribbon cable, the communication cable 102 may be terminated on one or both ends with an MPO-style female connector and the optoelectronic module 100 may include a corresponding MPO-style male connector configured to pluggably receive the MPO-style female connector.

In some embodiments, the communication cable 102 may be a multichannel fiber-optic communication cable that includes twelve (12) fibers, four (4) of which may be employed to transfer data signals in one direction, four (4) of which may be employed to transfer data signals in the opposite direction, and four (4) of which may not currently be in use but are available for future use.

The optoelectronic module 100 may be configured for optical signal transmission and reception at a variety of per-second data rates including, but not limited to, 40 Gbit or higher. Further, the optoelectronic module 100 may be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, 1610 nm, or longer wavelengths. Also, the optoelectronic module 100 may be configured to support various communication protocols including, but not limited to, INFINIBAND, Fast Ethernet, Gigabit Ethernet, 10 Gigabit Ethernet, 1×, 2×, 4×, 8×, and 10× Fibre Channel, and SONET OC-3, OC-12, OC-48, OC-192, and OC-768. Further, the optoelectronic module 100 may be configured to operate at various temperature ranges including, but not limited to, 0° C. to 70° C. and −40° C. to 85° C. In addition, although the example optoelectronic module 100 may be configured to be substantially compliant with the QSFP MSA, the optoelectronic module 100 may instead be configured to assume a variety of different form factors that are substantially compliant with various transceiver and/or transponder MSAs including, but not limited to, SFF, SFP, XFP, XPAK, X2, XENPAK, or CXP.

The optoelectronic module 100 may include a pull tab 104 operably connected to a release slide 106 that can collectively be employed to insert the optoelectronic module 100 into a cage of a host device (not shown) and to extract the optoelectronic module 100 from the cage. The pull tab 104 and/or release slide 106 may be made from rubber, plastic, sheet metal, or the like. The optoelectronic module 100 further includes a housing 108 that generally includes a top shell 110 and a bottom shell 112. The top and bottom shells 110 and 112 may be formed from zinc with a copper-nickel coating, for example.

Figure 2:
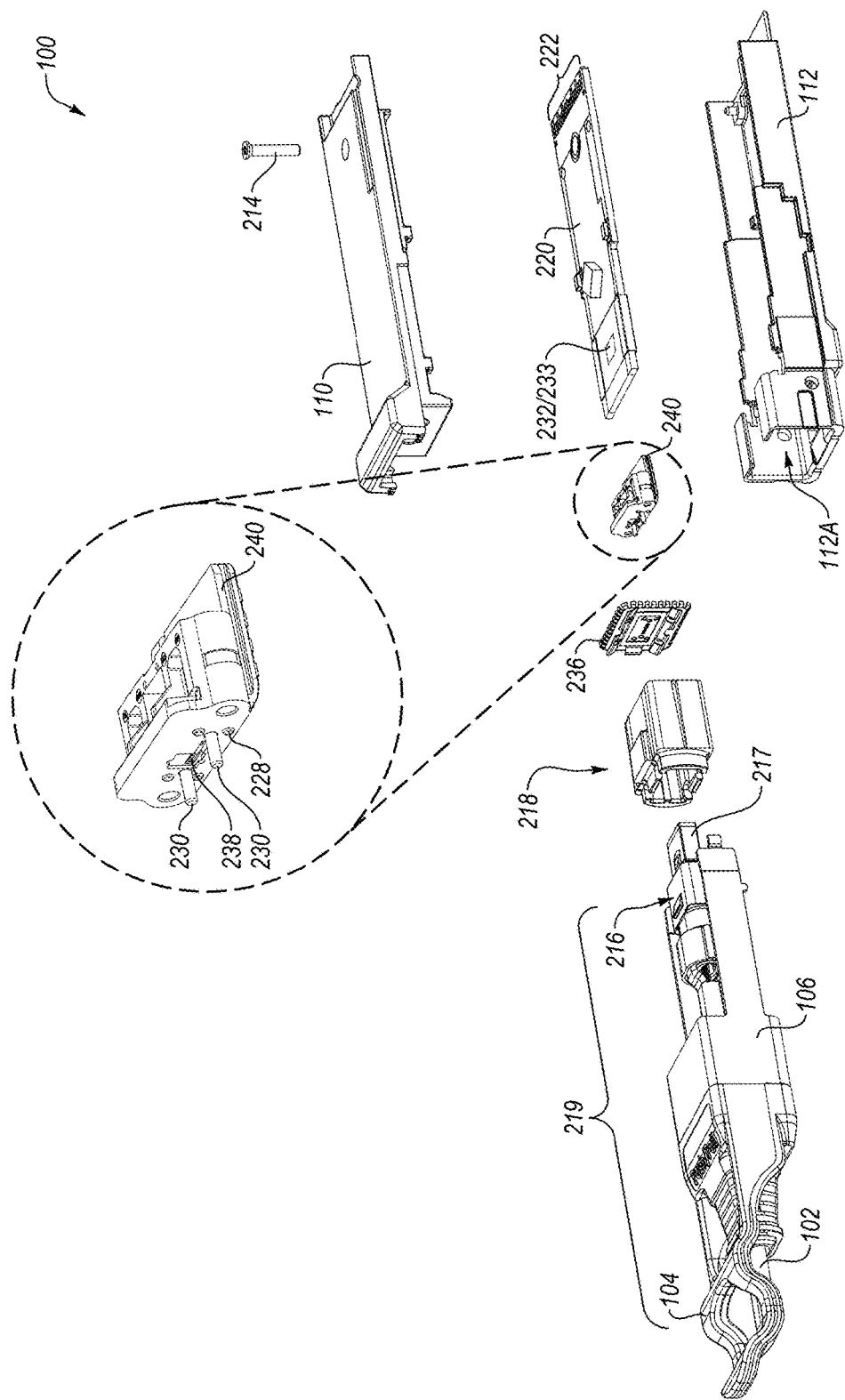
FIG. 2 is an exploded perspective view of the example optoelectronic module and attached communication cable of FIG. 1A showing an example modified MPO-style male connector and an example alignment guide.

With reference now to FIG. 2, additional aspects of the optoelectronic module 100 are disclosed. In particular, FIG. 2 discloses that the top and bottom shells 110 and 112 of the optoelectronic module 100 are configured to be held together with a fastener 214 and partially surround a modified MPO-style plug 216 with a female MT-style ferrule 217 attached to the communication cable 102. The modified MPO-style plug 216 may be configured to be received within a modified MPO-style receptacle, known as an alignment guide 218. The alignment guide 218 is disposed within an alignment guide receptacle 112A of the bottom shell 112. The modified MPO-style plug 216, communication cable 102, pull tab 104 and release slide 106 collectively form a cable assembly 219.

The top and bottom shells 110 and 112 also generally surround a PCB 220 having an exposed edge connector 222, a lens block 240, alignment pins 230, a transmitter device or array 232 (e.g., a vertical-cavity surface-emitting laser (VCSEL)), a receiver device or array 233 (e.g., photo diode), and an EMI containment assembly 236.

The lens block 240 includes alignment protrusions 238 and alignment indentations 228. The alignment pins 230, alignment protrusion 238, and alignment indentations 228 facilitate the alignment of the alignment guide 218, the EMI containment assembly 236, and the lens block 240. In one embodiment, the alignment pins 230 are attached to the lens block 240. Additionally, the alignment pins may be integral or formed as part of the lens block 240. The transmitter or receiver array 232 or 233 may be electrically and physically coupled to the PCB 220. The lens block 240 and the EMI containment assembly 236 may be physically coupled to the alignment guide 218. The alignment guide 218 attached to the EMI containment assembly 236 and also attached to the lens block 240 may then be attached to the PCB 220. The PCB 220 with the attached lens block 240, EMI containment assembly 236, and alignment guide 218 may then be coupled to the bottom shell 112.

In operation, outgoing electrical data signals travel via the edge connector 222 from the host device (not shown) into the optoelectronic module 100 including the PCB 220. Transmitter circuitry (not shown) on the PCB 220 refines these electrical data signals before passing them along conductive traces (not shown) to the transmitters of the transmitter array 232. The transmitters of the transmitter array 232 convert these electrical data signals into optical data signals before transmitting them through the lens block 240, the EMI containment assembly 236, the alignment guide 218, and the modified MPO-style plug 216, and into the fiber-optic communication cable 102. In this manner, the host device (not shown) into which the optoelectronic module 100 may be positioned, can communicate with a remote host device (not shown).

The transmitter array 232 may be an array of optical transmitters such as vertical-cavity surface-emitting lasers (VCSELs), or the like. For example, the transmitter array 232 may be a four (4) channel VCSEL array. In some embodiments, both a transmitter array 232 and a receiver array 233 may be included in the optoelectronic module 100, such that the optoelectronic module 100 may become both an optical transmitter and receiver. Alternately or additionally, the optoelectronic module 100 may include only a single transmitter rather than a transmitter array 232.

The various embodiments described herein include a system and method for directly coupling light from laser devices into fibers and from fibers onto photo diodes without use of a fiber patch cord or a flex circuit. The system and method extends the lens block 240 and the PCB 220 to the front or end of the optoelectronic module 100 where the MPO-style plug 216 may be received.

Figure 3:
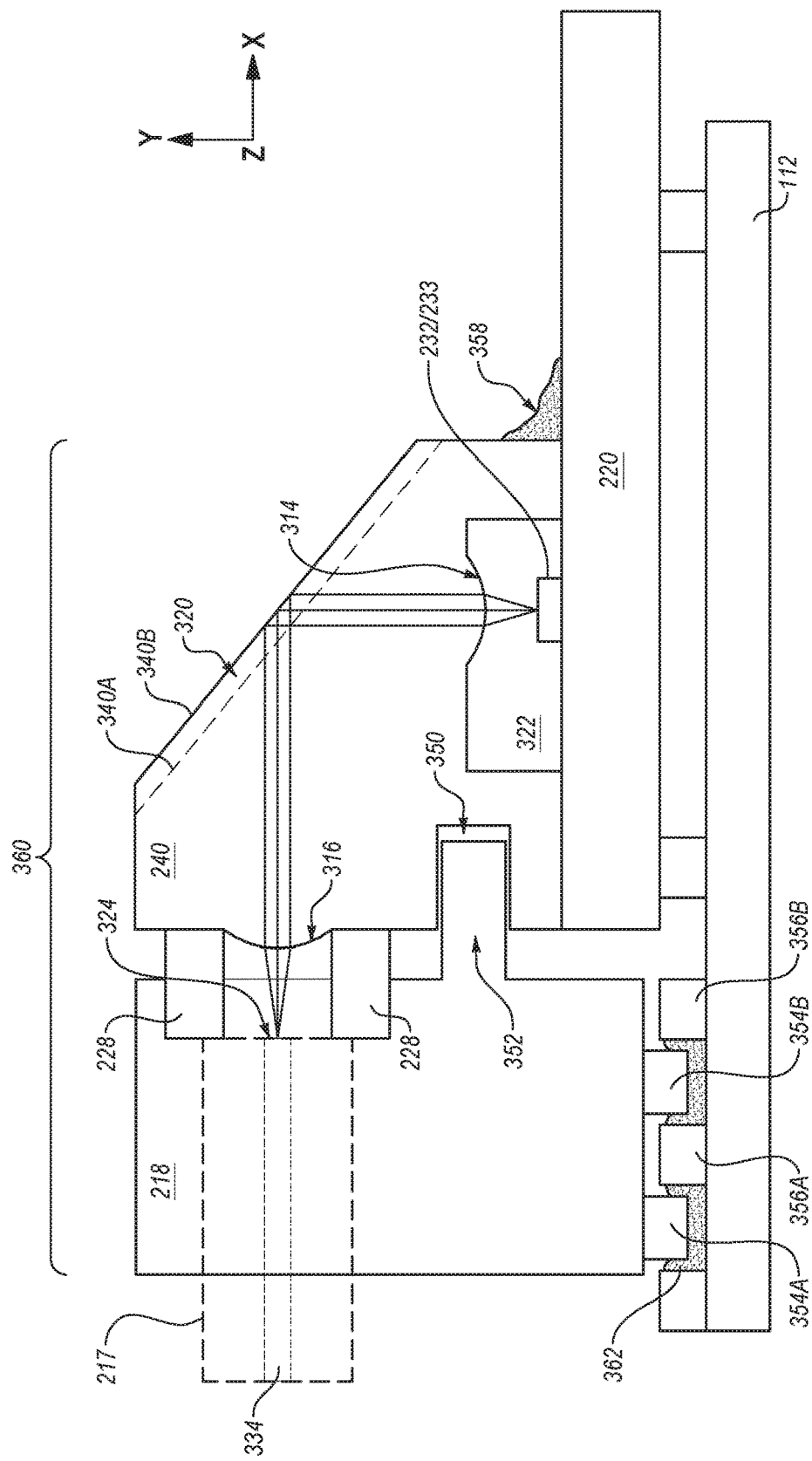
FIG. 3 illustrates a cross-sectional view of a simplified sectional view of a portion of the optoelectronic module of FIGS. 1A-1B and FIG. 2.

FIG. 3 illustrates a cross-sectional view of a partial view of the optoelectronic module 100 of FIGS. 1A-1B and FIG. 2, in accordance with one embodiment. As described above, optical signals may be generated from electrical signals received from a host device (not shown) along traces on the PCB 220. The PCB 220 may include one or more optoelectronic devices, such as the transmitter array 232 which may be configured as a VCSEL array, for converting electrical signals into optical signals. The PCB 220 may be oriented substantially planer to at least one of the top and bottom shells 110 and 112 of the housing 108 (FIGS. 1A and 1B). The optical signals generated by the transmitter array 232 may optically couple to the lens block 240. The lens block 240 may further optically couple the optical signals to optical fibers 334 through the female MT-style ferrule 217 in the MPO-style plug 216 as coupled to the alignment guide 218.

The lens block 240 may include one or more focusing lenses 316. The focusing lenses 316 may be positioned across from each of ends 324 of the optical fibers 334. As used with reference to the focusing lenses 316 and the optical fibers 334, the term "across" may include being positioned to receive optical signals exiting one of the optical fibers 334 or being positioned to communicate optical signals to one of the optical fibers 334. The term "across" includes displaced in substantially the negative X direction from the end 324 of one of the optical fibers 334. In FIG. 3, only one of the focusing lenses 316 is visible. In this and other embodiments, the lens block 240 may include more than one focusing lens 316. In some embodiments, the focusing lenses 316 may be integrally formed to the lens block 240.

The lens block 240 may also include an angled surface 320. In some embodiments, the angled surface 320 may be offset from the focusing lenses 316 in the X direction. In addition, in these and other embodiments, between the focusing lenses 316 and the angled surface 320, the lens block 240 may be solid.

The angled surface 320 may be reflective or at least partially reflective. Thus, the angled surface 320 may redirect optical signals that impinge the angled surface 320. For example, optical signals exiting the optical fibers 334 travelling in the positive X direction may enter the focusing lenses 316, continue to travel in the positive X direction, impinge on the angled surface 320, and be redirected in the negative Y direction.

The lens block 240 may also include one or more focusing lenses 314. The focusing lenses 314 in FIG. 3 may be displaced in the Z direction and in the X direction from one another. One or more of the focusing lenses 314 may be positioned across from each of the optical components, such as transmitter array 232 or receiver array 233. As used with reference to the focusing lenses 314 and the transmitter array 232, the term "across" may include being positioned to receive optical signals exiting a transmitter of the transmitter array 232 or being positioned to communicate optical signals to a receiver (e.g., photo diode) of a receiver array 233. The term "across" includes being displaced in the Y direction from transmitter or receiver array 232/233. In FIG. 3 only one of the focusing lenses 314 is visible. In this and other embodiments, the lens block 240 may include more focusing lenses 314. In some embodiments, the focusing cavity lenses 314 may be integrally formed to the lens block 240.

In some embodiments, the angled surface 320 may include multiple facets 340A-340B (generally, facet or facets 340) that redirect the optical signals toward different focusing lenses 314 or different focusing lenses 316.

The lens block 240 may define a cavity 322. The cavity 322 may be configured such that the optical components including the transmitter or receiver array 232/233 may be positioned in the cavity 322 and mounted or otherwise mechanically secured to the PCB 220. Additionally, the cavity 322 may be configured such that each of the optical components, such as transmitter or receiver array 232/233, may be positioned across from one of the focusing lenses 314.

The lens block 240 may further include the alignment pins 230 (FIG. 2). As stated, the alignment pins 230 facilitate the alignment of the lens block 240 to the female MT-style ferrule 217 with the alignment guide 218 via the EMI containment assembly 236 (FIG. 2). The lens block 240 may further include an alignment feature 350 which may be a groove, indentation, slot (as shown), or the alignment feature may be a protrusion, pin, tab or other shape for interfacing with a corresponding alignment feature 352 on the alignment guide 218. The alignment features 350 and 352 cooperatively align the lens block 240 and the alignment guide 218 in at least the Y direction.

The alignment guide 218 further includes two more alignment features 354A and 354B (collectively 354) on the alignment guide 218. The alignment 354 may be a groove, indentation, slot, or the alignment feature may be a protrusion, pin, tab (as shown) or other shape for interfacing with a corresponding alignment feature 356A and 356B (collectively 356) on the bottom shell 112. The lens block 240 and the alignment guide 218, when assembled together, form a lens block-alignment guide assembly 360. During assembly of the optoelectronic module 100 as further described below, the lens block-alignment guide assembly 360 may be mounted to the PCB 220 and the bottom shell 112 using, for example, an adhesive 362. The lens block 240 may attach to the PCB 220 using one or more of adhesives, such as adhesive 358. Alternative mounting techniques are also contemplated.

Figure 4:
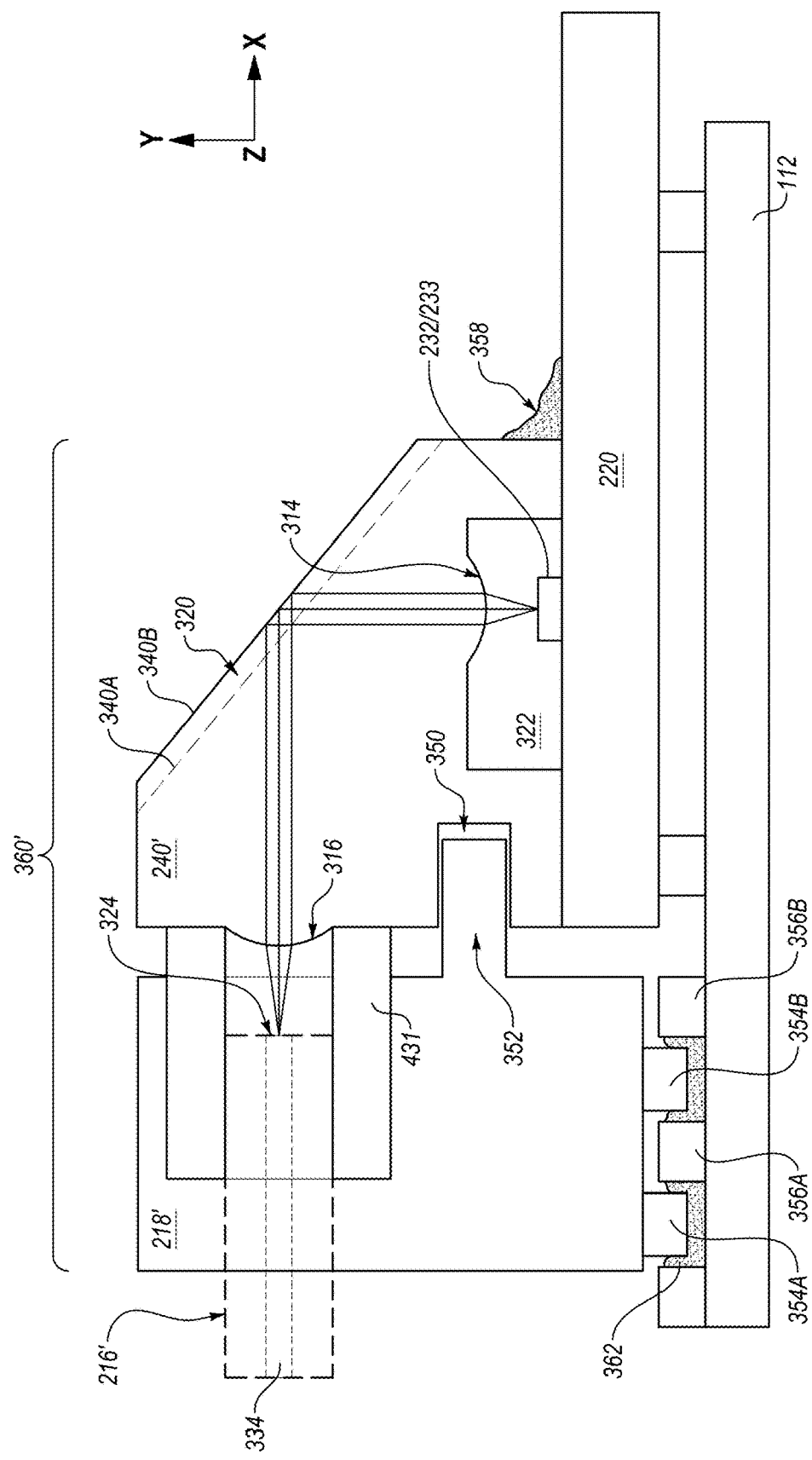
FIG. 4 illustrates a cross-sectional view of a simplified sectional view of a portion of an alternative optoelectronic module of FIGS. 1A-1B and FIG. 2.

FIG. 4 illustrates a cross-sectional view of a partial view of the optoelectronic module 100 of FIGS. 1A-1B and FIG. 2, in accordance with another embodiment. As described above, optical signals may be generated from electrical signals received from a host device (not shown) along traces on the PCB 220. The PCB 220 may include one or more optoelectronic devices, such as the transmitter array 232 which may be configured as a VCSEL array, for converting electrical signals into optical signals or the receiver array 233 which may be configured as a photo diode array, for converting optical signals into electrical signals. The optical signals may be optically coupled with the lens block 240'. The lens block 240' may further optically coupled the optical signals to optical fibers 334 in an LC or SC-style plug 216' as coupled to the alignment guide 218'.

The lens block 240' may include one or more focusing lenses 316. The focusing lenses 316 may be positioned across from each of ends 324 of the optical fibers 334. In FIG. 4, only one of the focusing lenses 316 is visible. In this and other embodiments, the lens block 240' may include more than one focusing lens 316. In some embodiments, the focusing lenses 316 may be integrally formed to the lens block 240'.

The lens block 240' may also include an angled surface 320, as described above with reference to FIG. 3. Further, the lens block 240' may also include one or more focusing lenses 314, as described above with reference to FIG. 3. In some embodiments, the angled surface 320 may include multiple facets 340A-340B (generally, facet or facets 340) that redirect the optical signals toward different focusing lenses 314 or different focusing lenses 316, as described above with reference to FIG. 3.

The lens block 140' may further include the alignment features 131 (FIG. 4). The alignment features 431, may be configured as a "barrel" configured to facilitate the alignment of the lens block 140' with the alignment guide 118' via the EMI containment assembly 136 (FIG. 2). The lens block 140' may further include an alignment feature 350, as described above with reference to FIG. 3. The alignment features 350 and 352 cooperatively align the lens block 140' and the alignment guide 118' in at least the Y direction.

The alignment guide 218' further includes more alignment features 354A and 354B (collectively 354), as described above with reference to FIG. 3. During assembly of the optoelectronic module 100 as further described below, the lens block-alignment guide assembly 360' may be mounted to the PCB 220 and the bottom shell 112 using, for example, an adhesive 362. The lens block 240' may attach to the PCB 220 using one or more of adhesives, such as adhesive 358. Alternative mounting techniques are also contemplated.

Figure 5:
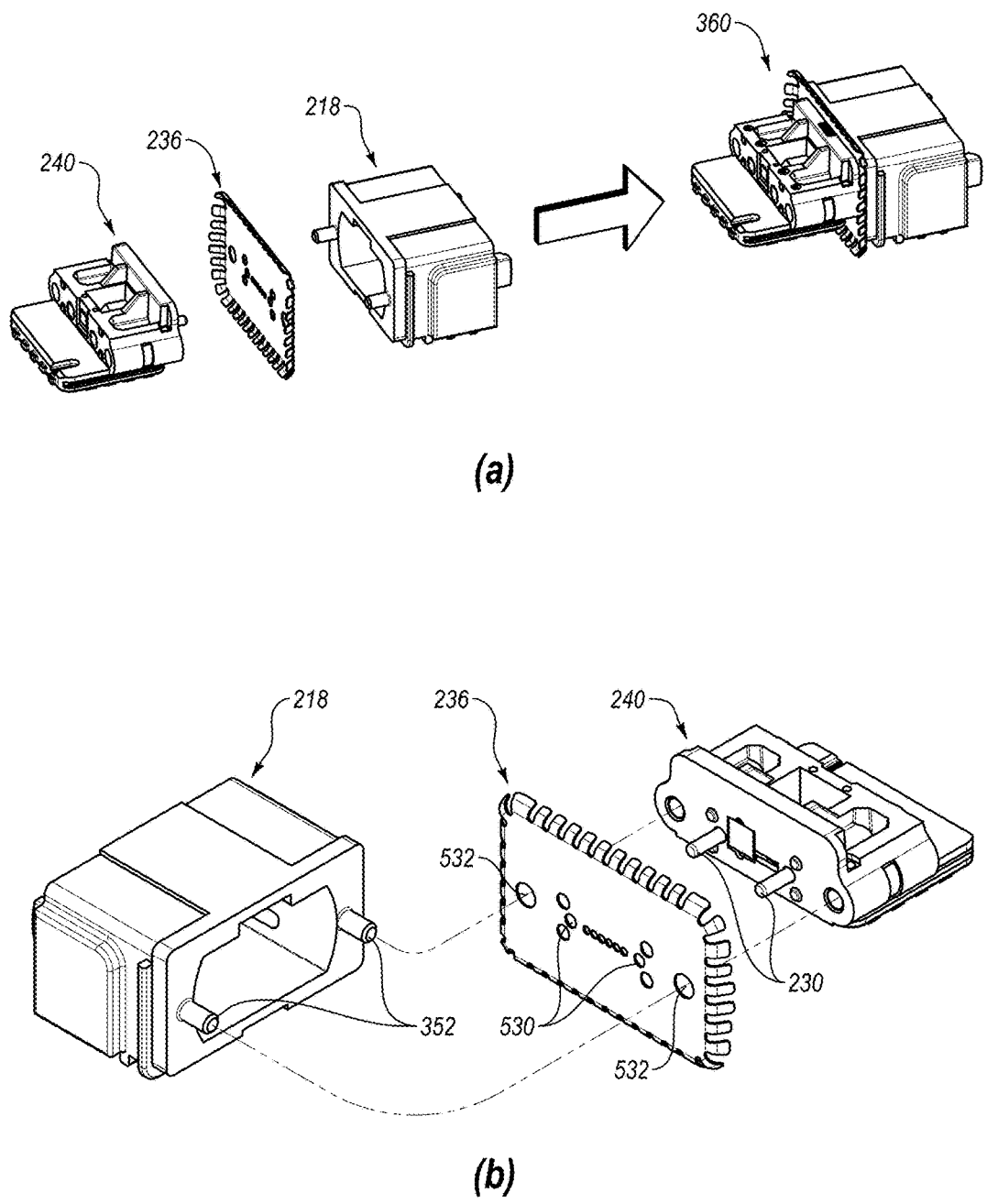
FIGS. 5-9 illustrate an assembly of the optoelectronic module, in accordance with various embodiments.

FIGS. 5-9 illustrate an assembly of the optoelectronic module 100, in accordance with various embodiments. In FIG. 5, the lens block-alignment guide assembly 360 and 360' of both FIGS. 3 and 4 may be formed by serially aligning the alignment guide 218, the EMI containment assembly 236 and the lens block 240. The alignment pins 230 on the lens block 240 may be passed through holes 530 to align the lens block 240 with the EMI containment assembly 236. Similarly, the alignment features 352 of the alignment guide 218 may be passed through holes 532 in the EMI containment assembly 236 to align the alignment guide 218 with the EMI containment assembly 236. The serially arranged alignment guide 218, EMI containment assembly 236 and lens block 240, result in the lens block-alignment guide assembly 360.

Figure 6:
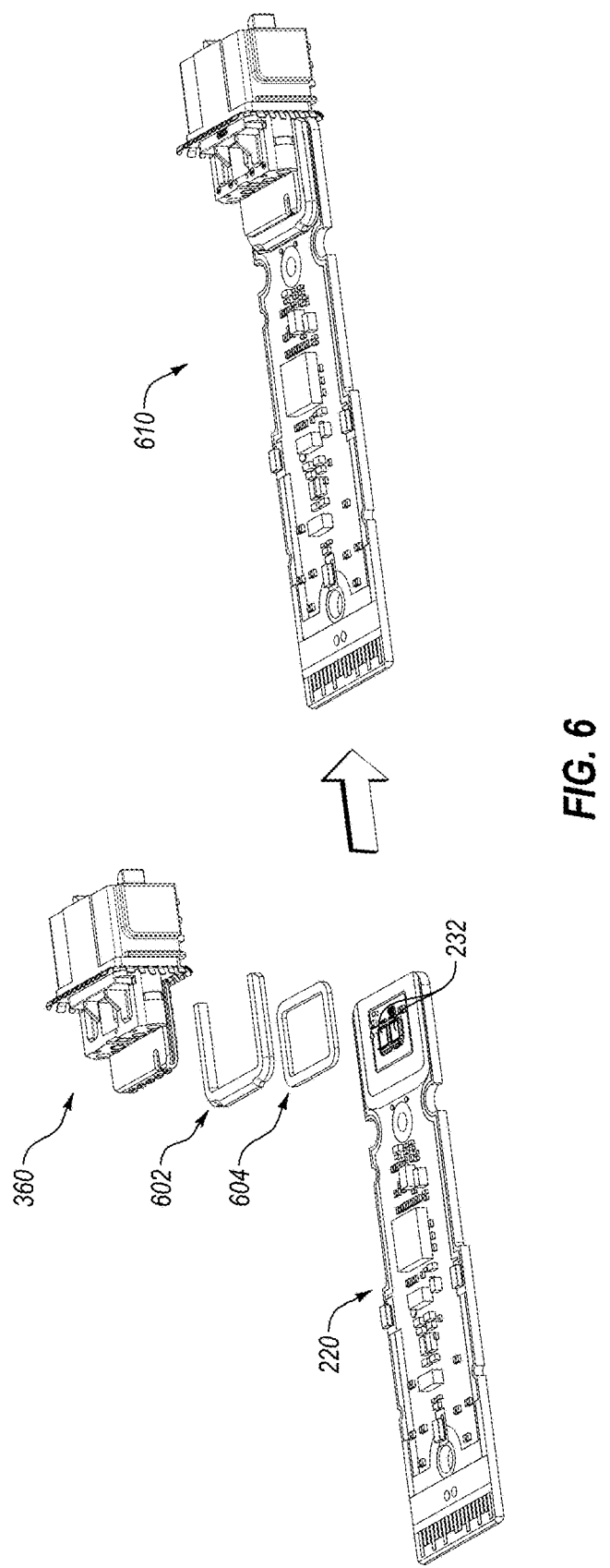

In FIG. 6, the lens block-alignment assembly 360 may be attached to the PCB 220. The PCB 220 may include the transmitter or receiver array 232/233. The lens block-alignment assembly 360 may attach to the PCB 220 using one or more of adhesives 602, 604, to form an optoelectronic assembly 610.

Figure 7:
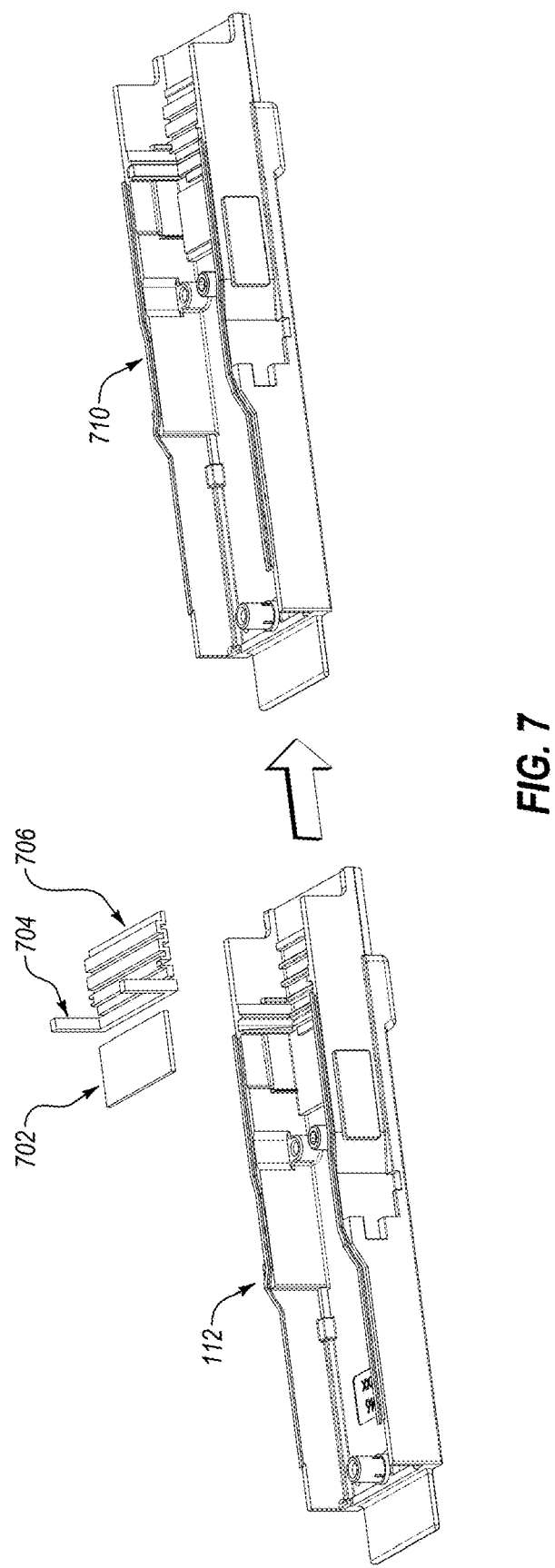

In FIG. 7, the bottom shell 112 may have attached thereto a thermal pad 702 and one or more adhesives 704, 706 for respectively retaining the EMI containment assembly 236 and the alignment guide 218 of the optoelectronic assembly 610 to form a bottom shell assembly 710.

Figure 8:
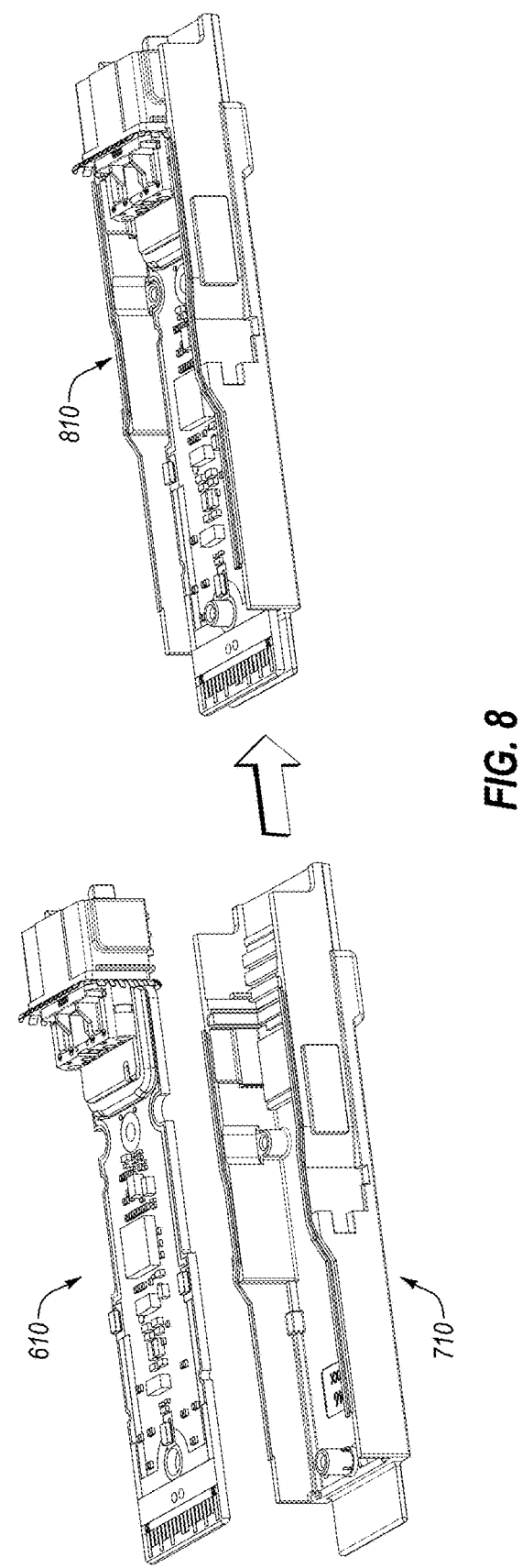

In FIG. 8, the optoelectronic assembly 610 may be attached to the bottom shell assembly 710 to form an optoelectronic bottom shell assembly 810. The optoelectronic assembly 610 may be retained to the bottom shell assembly 710 using the one or more adhesives 704, 706 of FIG. 7.

Figure 9:
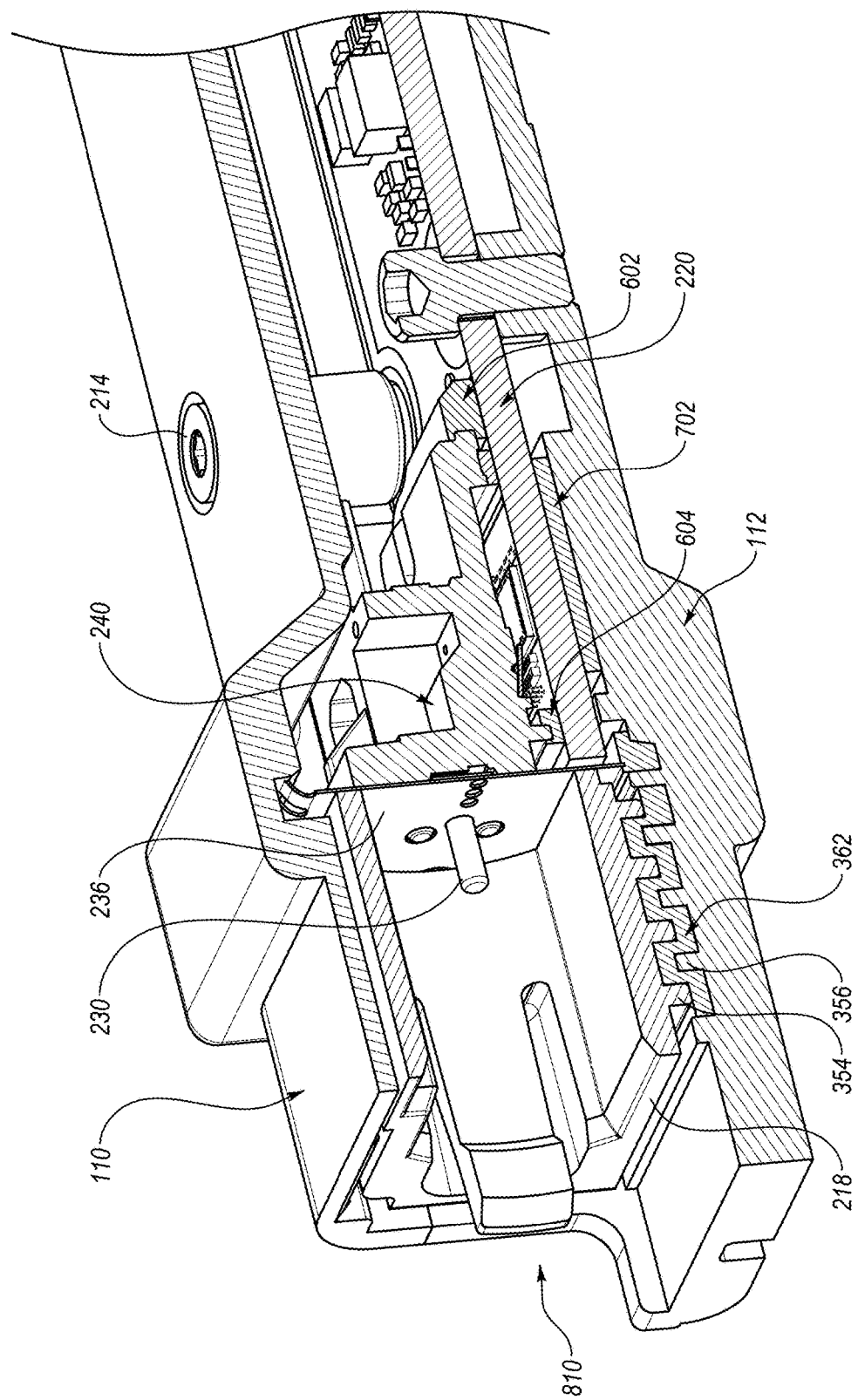

FIG. 9 is a cross-sectional view of the optoelectronic module 100 resulting from the top shell 110 being attached to the optoelectronic bottom shell assembly 810. In FIG. 9, some of the various elements of the optoelectronic module 100 described above are identified to illustrate the relationship of the various elements.

Figure 10:
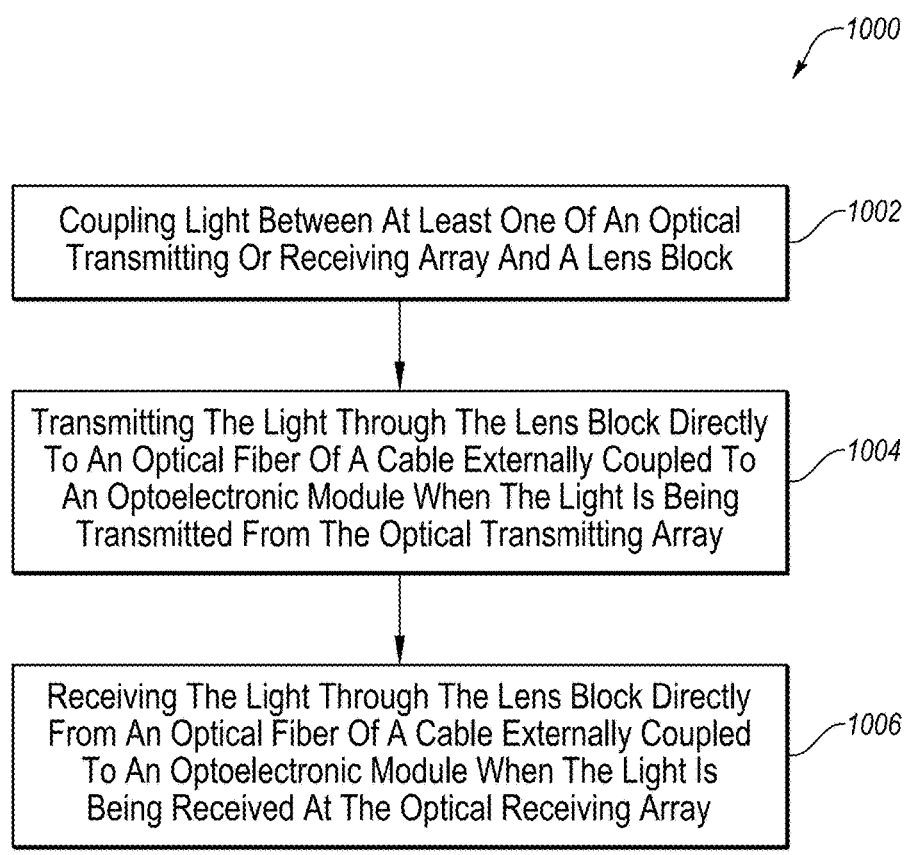
FIG. 10 is a flowchart for a method for coupling light between an optical transmitting or receiving device through a lens block, in accordance with an embodiment.

FIG. 10 is a flowchart for a method 1000 for coupling light between one of an optical transmitting or receiving array and a lens block, in accordance with an embodiment. In a step 1002, light may be coupled between one of an optical transmitting or receiving array and a lens block. The lens block may be formed to include a focusing lens for focusing light from the optical transmitting array into the lens block.

In a step 1004, the light may be transmitted through the lens block directly to an optical fiber of a cable externally coupled to the optoelectronic module when the light is being transmitted by the optical transmitting array.

In a step 1006, the light may be received through the lens block directly from an optical fiber of a cable externally coupled to the optoelectronic module when the light is being received at the optical receiver array.

The lens block may be formed to include another focusing lens for focusing the light from the lens block into the optical fibers of the cable. Further, the lens block may perform the step of reflecting the light on an angled surface of the lens block between the optical transmitting array and the optical fibers of the cable. Further, the method may include the step of aligning in at least one axis the lens block with an alignment guide configured to receive the cable. Further steps may include aligning in at least one axis the lens block with a shell of a housing of the optoelectronic module.

The described embodiments are to be considered in all respects only as illustrative and not restrictive. The scope of the embodiments are, therefore, indicated by the appended claims rather than by the foregoing description. All changes which come within the meaning and range of equivalency of the claims are to be embraced within their scope.

What is claimed is:

1. An optoelectronic module, comprising:
   a printed circuit board (PCB) including at least one of an optical transmitting or receiving array mounted thereon;
   an alignment guide; and
   a lens block mounted to the PCB and configured to directly couple light between an optical fiber external to the optoelectronic module and the at least one of an optical transmitting or receiving array, wherein the lens block includes a first integral alignment feature configured to at least partially receive the optical fiber therein, and wherein the lens block includes a second integral alignment feature to cooperatively align the alignment guide used to align the optical fiber to the lens block;
   wherein the alignment guide includes a third integral alignment feature to permit the alignment guide to be Movably aligned with respect to a housing surrounding the alignment guide.

2. The optoelectronic module of claim 1, wherein the lens block includes a focusing lens configured to focus light from the at least one of an optical transmitting or receiving array into the lens block.

3. The optoelectronic module of claim 2, wherein the focusing lens is integral with the lens block.

4. The optoelectronic module of claim 1, wherein the lens block includes a focusing lens configured to focus light from the lens block into the optical fiber of an optical cable.

5. The optoelectronic module of claim 4, wherein the focusing lens is integral with the lens block.

6. The optoelectronic module of claim 1, wherein the lens block includes an angled surface for reflecting the light between the at least one of an optical transmitting or receiving array and the optical fiber of an optical cable.

7. The optoelectronic module of claim 1, wherein the second integral alignment feature is configured to align in at least one axis of the lens block with the alignment guide.

8. The optoelectronic module of claim 1, wherein the third integral alignment feature is configured to align the lens block with the housing of the optoelectronic module.

9. The optoelectronic module of claim 8, wherein the lens block further includes alignment pins configured to align an optical cable with the lens block.

10. A method, comprising:
    coupling light between at least one of an optical transmitting or receiving array mounted on a printed circuit board (PCB) and a lens block mounted to the PCB, wherein the lens block includes a first integral alignment feature configured to at least partially receive an optical fiber therein, and wherein the lens block includes a second integral alignment feature to cooperatively align an alignment guide used to align the optical fiber to the lens block;
    transmitting the light through the lens block directly to the optical fiber of an optical cable externally coupled to an optoelectronic module when the light is being transmitted from the optical transmitting array;
    receiving the light through the lens block directly from the optical fiber of an optical cable externally coupled to an optoelectronic module when the light is being received at the optical receiving array; and
    Movably aligning the alignment guide with respect to a housing surrounding the alignment guide, wherein the alignment guide includes a third integral alignment feature that permits the alignment guide to be moved with respect to the housing surrounding the alignment guide.

11. The method of claim 10, further comprising focusing light from the optical transmitting array into the lens block.

12. The method of claim 10, further comprising focusing light from the optical fiber into the lens block.

13. The method of claim 10, further comprising reflecting the light on an angled surface of the lens block between the optical transmitting array and the optical fiber of the optical cable.

14. The method of claim 10, further comprising reflecting the light on an angled surface of the lens block between the optical fiber of the optical cable and the optical receiving array.

15. The method of claim 10, further comprising aligning in at least one axis the lens block with the alignment guide configured to receive the optical cable.

16. The method of claim 10, further comprising aligning in at least one axis the lens block with a shell of a housing of the optoelectronic module.

17. The method of claim 10, further comprising aligning the optical cable with the lens block with the first integral alignment feature of the lens block.

18. A system comprising:
    an optical cable that includes a plurality of optical fibers each including an end extending from the optical cable;
    a pluggable connector configured to removably couple an end of the optical cable to an optoelectronic module, wherein the pluggable connector comprises:
    an alignment guide; and
    a lens block mounted on a printed circuit board (PCB) and configured for directly coupling light from an optical transmitting array mounted on the PCB to the ends of the optical fibers, wherein the lens block includes first integral alignment features configured to at least partially receive the plurality of optical fibers therein, and wherein the lens block includes a second integral alignment feature to cooperatively align the alignment guide used to align the optical fiber to the lens block;
    wherein the alignment guide includes a third integral alignment feature to permit the alignment guide to be Movably aligned with respect to a housing surrounding the alignment guide.

19. The system of claim 18, the lens block further configured to reflect the light on an angled surface of the lens block between the optical transmitting array and the end of the optical fibers of the optical cable.

20. The optoelectronic module of claim 1, wherein:
    the first integral alignment feature permits the optical fiber to be movably aligned with respect to the lens block in a first direction;
    the second integral alignment feature permits the lens block to be movably aligned with respect to the alignment guide in the same first direction; and
    the third integral alignment feature permits the alignment guide to be movably aligned with respect to the housing in a second direction perpendicular to the first direction.

* * * * *